United States Patent
Zheng

(10) Patent No.: US 8,208,971 B2
(45) Date of Patent: Jun. 26, 2012

(54) INTEGRATED ACCESS SYSTEM OF WIRELESS AND WIRED NETWORK

(75) Inventor: Ruobin Zheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1310 days.

(21) Appl. No.: 11/628,080

(22) PCT Filed: Apr. 6, 2006

(86) PCT No.: PCT/CN2006/000612
§ 371 (c)(1),
(2), (4) Date: Sep. 24, 2007

(87) PCT Pub. No.: WO2006/105737
PCT Pub. Date: Oct. 12, 2006

(65) Prior Publication Data
US 2008/0153534 A1 Jun. 26, 2008

(30) Foreign Application Priority Data
Apr. 7, 2005 (CN) .......................... 2005 1 0063231

(51) Int. Cl.
*H04B 1/38* (2006.01)
(52) U.S. Cl. ............. 455/572; 455/556.1; 455/557; 455/561; 455/562.1; 455/522; 455/554.2; 455/408; 455/443
(58) Field of Classification Search ............... 455/556.1, 455/557, 561, 562.1, 522, 554.2, 408, 443, 455/572
See application file for complete search history.

(56) References Cited

U.S. PATENT DOCUMENTS

| | | | |
|---|---|---|---|
| 5,602,843 A * | 2/1997 | Gray | 370/338 |
| 5,953,651 A | 9/1999 | Lu et al. | |
| 6,640,108 B2 * | 10/2003 | Lu et al. | 455/463 |
| 6,771,933 B1 * | 8/2004 | Eng et al. | 455/41.2 |
| 6,876,852 B1 * | 4/2005 | Li et al. | 455/426.2 |
| 6,975,634 B1 * | 12/2005 | Chow et al. | 370/401 |
| 7,082,320 B2 * | 7/2006 | Kattukaran et al. | 455/562.1 |
| 7,428,428 B2 * | 9/2008 | Wong et al. | 455/562.1 |
| 7,636,347 B2 * | 12/2009 | Ishii et al. | 370/352 |
| 2001/0041553 A1 * | 11/2001 | Chang et al. | 455/406 |
| 2002/0055370 A1 * | 5/2002 | Chen | 455/557 |
| 2003/0221034 A1 * | 11/2003 | Cheng | 710/301 |

(Continued)

FOREIGN PATENT DOCUMENTS

CN   1464710 A   12/2003

(Continued)

OTHER PUBLICATIONS

Extended European Search Report issued in European Patent Application No. EP 06 72 2264, dated Jun. 26, 2007.

(Continued)

*Primary Examiner* — Kwasi Karikari
(74) *Attorney, Agent, or Firm* — Conley Rose, P.C.; Grant Rodolph

(57) ABSTRACT

An integrated access system of a wireless and wired network is provided. The system includes a basic network and a newly-added network, wherein the newly-added network includes an access processing device combination and a terminal communication device, the access processing device combination combines with a communication device of the basic network, to realize service functions of the newly-added network via information interaction with the terminal communication device.

26 Claims, 5 Drawing Sheets

U.S. PATENT DOCUMENTS

| | | | |
|---|---|---|---|
| 2004/0198219 A1* | 10/2004 | Malmstrom et al. | 455/41.1 |
| 2004/0242230 A1 | 12/2004 | Rue | |
| 2005/0089052 A1* | 4/2005 | Chen et al. | 370/401 |
| 2005/0096086 A1* | 5/2005 | Singamsetty | 455/557 |
| 2005/0119025 A1* | 6/2005 | Mohindra et al. | 455/552.1 |
| 2005/0232189 A1* | 10/2005 | Loushine | 370/328 |
| 2005/0239496 A1* | 10/2005 | Sylvain | 455/552.1 |

FOREIGN PATENT DOCUMENTS

| | | |
|---|---|---|
| CN | 2632957 Y | 8/2004 |
| EP | 0 596 727 A2 | 5/1994 |
| EP | 1 265 420 A2 | 12/2002 |

OTHER PUBLICATIONS

Foreign Communication From a Related Counterpart Application, Chinese Application No. 2005100632318, Chinese Office Action dated Jun. 22, 2007, 5 pages.

Foreign Communication From a Related Counterpart Application, Chinese Application No. 2005100632318, Chinese Office Action dated Jan. 18, 2008, 4 pages.

Foreign Communication From a Related Counterpart Application, PCT Application PCT?CN2006/000612, Written Opinion dated Jul. 27, 2006, 3 pages.

* cited by examiner

INTEGRATED ACCESS SYSTEM OF WIRELESS AND WIRED NETWORK

FIELD OF THE INVENTION

The present invention relates to communication, particularly to an integrated access system of a wireless and wired network.

BACKGROUND OF THE INVENTION

In order to efficiently utilize wireless access techniques such as Worldwide Interoperability for Microwave Access (WiMAX) to cover an area, wireless network planning and optimization are necessary to determine the optimal base station site, in accordance with factors such as geographic environment and wireless channel propagation environment of the area. FIG. 1 is a schematic diagram illustrating the base station site in Beijing by using wireless access techniques.

Similarly, in order to efficiently utilize wired access techniques such as Asymmetric Digital Subscriber Loop (ADSL) to cover the same area, such as Beijing, as illustrated in FIG. 2, wired network planning and optimization is also necessary to determine the optimal site of the wired device in accordance with factors such as geographic environment and wired channel propagation environment of the area.

The technical solution of the prior art is as follows:

Two access networks are constructed respectively, i.e., a wired access network such as Digital Subscriber Loop (DSL) broadband access network and a wireless network such as WiMAX cellular access network. The wired access network is optimized with the wired access network optimization method, and the wireless access network is optimized with the wireless access network optimization method.

It can be seen from the technical solution of the prior art:

If Carrier A firstly constructed a wired access network covering an area by utilizing wired access techniques, and then constructed a wireless access network covering the same area by utilizing wireless access techniques. Or in the other case, i.e., Carrier B firstly constructed a wireless access network covering an area by utilizing wireless access techniques, and then constructed a wired access network covering the same area by utilizing wired access techniques. As described before, in wireless network planning and wired network planning, optimal sites selection is performed in accordance with their own access techniques respectively, so it may result in difference between the site of an original network device and the optimal site of a newly-added network device. Referring to FIG. 3, the differences between the optimal sites of the original wired devices/wireless Base Stations (BSs) and the optimal sites of the newly-added wireless BSs/wired devices can be up to several kilometers. Therefore, there exists an issue in the prior art that the site selection for the wired devices/wireless BSs of the original network is in contradiction to the site selection for the wireless BSs/wired devices of the newly-added network.

The optimal sites of the wired devices/wireless BSs of the original network are different from the optimal sites of the wireless BSs/wired devices of the newly-added network, and in the prior art, the original network and the newly-added network are independent of each other, so resources can not be efficiently utilized. For example, in the prior art, both the BSs of the wireless access network and the wired devices of the wired network are supplied with AC power supply, and are provided with backup power supplies by using battery pack, Un-interruptible Power Supplies (UPS), power generation set or the second mains power; cable resources of the wireless access network and the wired access network can not be efficiently utilized; and operators usually need to take the land on lease and construct machine-rooms for the BSs of the wireless access network and the wired devices of the wired access network respectively.

Furthermore, it is difficult to uniformly maintain the BSs of the wireless network and the wired devices of the wired network, which can result in high maintenance cost.

SUMMARY OF THE INVENTION

An embodiment of the present invention provides an integrated access system of a wireless and wired network, to integrate the original network with the newly-added network, so as to effectively utilize resources.

In addition, embodiments of the present invention result in lower maintenance cost.

An integrated access system of a wireless and wired network according to an embodiment of the present invention includes: a basic network and a newly-added network, wherein the newly-added network includes an access processing device combination and a terminal communication device, the access processing device combination is combined with a communication device of the basic network, to realize service functions of the newly-added network via information interaction with the terminal communication device.

It can be seen from the technical solution according to an embodiment of the present invention that, the system according to an embodiment of the present invention utilizes distributed device technique, combines access processing devices of a newly-added network with communication devices of an original network, and realizes services of the newly-added network via information interaction with terminal communication devices, so as to sufficiently utilize resources of the original network. For example, cable resources of the wireless access network and the wired access network can be sufficiently utilized; the base stations of the wireless access network and the wired devices of the wired access network can share the leased land, so as not to construct machine-room respectively.

In addition, in an embodiment of the present invention, a power supply unit can supply power simultaneously for devices of the basis network and the added network by using the remote power supply technique, so as to address the ineffective resource utilization and higher maintenance cost in the prior art.

Further, the information interaction between the power supply unit and the terminal communication device can serve as an out-of-band management channel for the terminal communication device. By this way, the monitoring and alarming function in case of order and failure can be realized so as to facilitate management, failure location, remote maintenance of devices, etc.

DETAILED DESCRIPTION OF THE INVENTION

Figure 1:
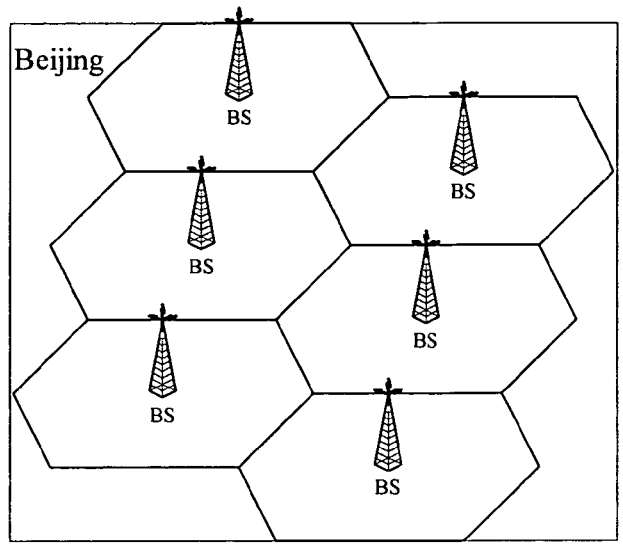
FIG. 1 is a schematic diagram illustrating the base station site selection for the wireless network planning.
Figure 2:
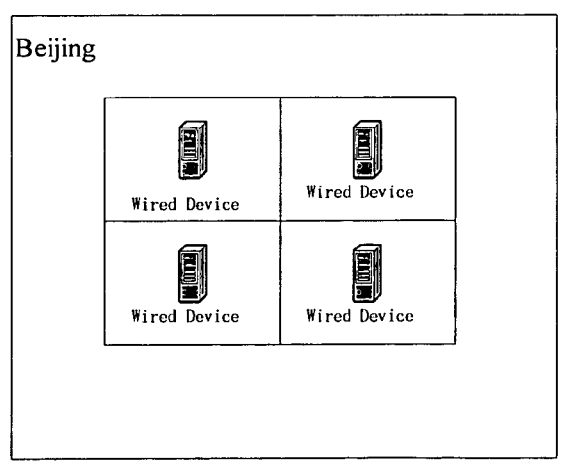
FIG. 2 is a schematic diagram illustrating the device site selection for the wired network planning.
Figure 3:
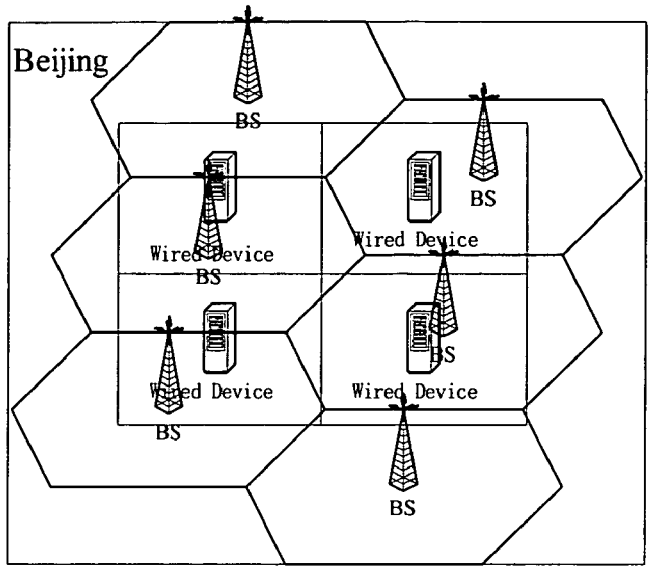
FIG. 3 is a schematic diagram illustrating the device site selection for the wireless network planning and the wired network planning.

An embodiment of the present invention provides an integrated access system of a wireless and wired network, in which: the system includes a basic network and a newly-added network; the newly-added network includes a local communication device and a remote communication device; the local communication device is combined with communication devices of the basic network (e.g., the local communication device is arranged in or connected with a communication device of the basic network via cable) and interacts information with the remote communication device so as to realize the services of the newly-added network.

The embodiments of the present invention are in three cases:

The first case: Carrier A has constructed a wired access network covering an area by utilizing wired access techniques. Then Carrier A wants to directly upgrade the existing wired devices, e.g., to add a wireless access card in each original wired device, in order to develop an integrated access device of a wired and wireless network, which can support both original wired access subscribers and newly-added wireless access subscribers in the same area, i.e., a wireless access network overlaps the original wired access network. In this case, in an embodiment of the present invention, the wired access network can be considered as the basic network and the wireless access network can be considered as the newly-added network; devices of the wireless access network, arranged in the basic network, can be considered as local communication devices; the rest devices of the wireless access network can be considered as remote communication devices.

The second case: Carrier B has constructed a wireless access network covering an area by utilizing wireless access techniques. Then Carrier B wants to directly upgrade the existing base stations, e.g., to add a wired access card in each original base station in order to support both original wireless access subscribers and newly-added wired access subscribers in the same area, i.e., a wired access network overlaps the original wireless access network. In this case, in an embodiment of the present invention, the wireless access network can be considered as the basic network and the wired access network can be considered as the newly-added network; the devices of the wired access network arranged in the basic network can be considered as local communication devices; the rest devices of the wired access network can be considered as remote communication devices.

The third case: Carrier C wants to utilize an integrated device of a wireless and wired network, he has to simultaneously construct the wireless access network and the wired access network. In this case, in an embodiment of the present invention, the wired access network can be considered as the basic network and the wireless access network can be considered as the newly-added network, just like the first case; or, the wireless access network can be considered as the basic network and the wired access network can be considered as the newly-added network, just like the second case.

Figure 4:
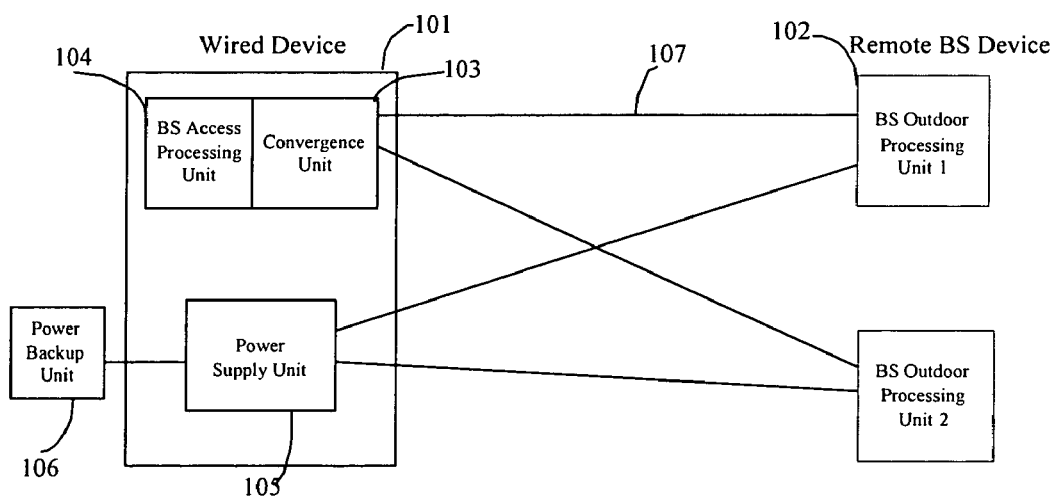
FIG. 4 is a schematic diagram illustrating the structure according to a first embodiment of the present invention.

In the first case, a first embodiment of the present invention is shown in FIG. 4, including a local wired device 101, remote base station devices (i.e., the base station outdoor processing units) 102, a convergence unit 103, a base station access processing unit 104, a power supply unit 105 and a power backup unit 106. Local communication devices include some devices of the original existing wired access network.

In the first embodiment of the present invention, the base station access processing unit 104 and the convergence unit 103 are arranged in the wired device 101 of the local wired access network. The optimal site selection for the local wired device 101 is implemented in accordance with the wired network planning. The base station outdoor processing units 102 are arranged remotely, for which the optimal site for is implemented in accordance with the wireless network planning, and is connected remotely with the local wired device 101 via wired cable 107 (such as optimal fiber or twisted-pair cable). The base station access processing unit 104 and the convergence unit 103 can be considered as an access processing device combination; and the base station outdoor processing units 102 can be considered as terminal communication devices.

The power supply unit 105 is arranged in the wired device 101 of the local wired access network, which supplies power for the base station access processing unit 104 and the convergence unit 103, and supplies remote power for the base station outdoor processing units 102 via the wired cable 107.

In the wired cable 107 via which the local wired device 101 and the remote base station devices 102 are connected remotely, the signal cable and the power cable are separate logically, but can be separate or in co-line physically.

The base station outdoor processing units 102 and the base station access processing unit 104 perform wireless access processing interoperably (for example, the base station outdoor processing unit 102 can include a radio frequency processing module, an intermediate frequency processing module and an antenna, while the base station access processing unit 104 executes baseband processing and processing for the wireless data link layer). The convergence unit 103 converges wireless access signals received by the multiple base station outdoor processing units 102 and transmits the signals to the base station access processing unit 104, and distributes signals generated by the base station access processing unit 104 to the multiple base station outdoor processing units 102 so as to transmit the signals to wireless access subscribers via the antenna. The power supply unit 105 transforms a mains power input (such as 110V/220V AC power) or a DC power input (such as −48V/−60V DC power) into a high-voltage DC power output (such as 270V DC power), and supplies the power for the remote base station outdoor processing units 102 via wired cable (such as twisted-pair cable). The distance for remote power supply, which can be as much as 2~5 kilometers, is affected by factors such as the diameter of wired cable, the number of the cable pairs, the power consumption of the base station outdoor processing units 102 and the output voltage of the power supply unit 105. The power supply unit 105 supports information interaction between the base station outdoor processing units 102 and the power supply unit 105, serving as an out-of-band management channel for the base station outdoor processing units 102. By this way, the monitoring and alarming function in normal case and in a failure can be realized so as to facilitate management, failure location, remote maintenance of devices, etc.

The power backup unit 106 is used to backup the power, which can be a battery pack, a UPS, a power generation set, or a second mains power.

In the first case, the second embodiment differs from the first embodiment according to the present invention in that:

The power supply unit includes a central power supply unit and a remote power supply unit.

The central power supply unit is arranged in the wired device of the local wired access network, which supplies power for the base station access processing unit and the convergence unit; the remote power supply unit is arranged remotely and connected remotely with the central power supply unit, which supplies power for the base station outdoor processing unit nearby.

The second embodiment is identical with the first embodiment except for the differences mentioned above, so the details will not be described.

Figure 5:
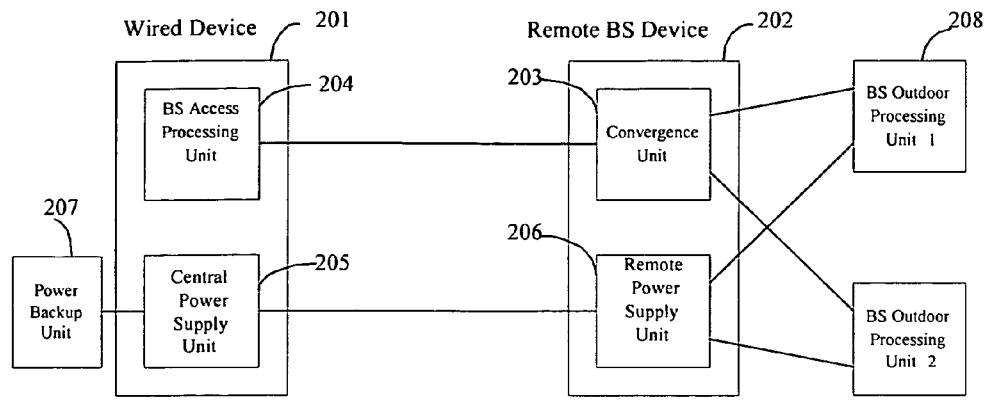
FIG. 5 is a schematic diagram illustrating the structure according to a third embodiment of the present invention.

In the first case, the third embodiment of the present invention is shown in FIG. 5, including a local wired device 201, a remote base station device 202, a convergence unit 203, a base station access processing unit 204, a central power supply unit 205, a remote power supply unit 206, a power backup unit 207, and base station outdoor processing units 208. The local communication device includes some devices of the original existing wired access network.

The base station access processing unit 204 and the central power supply unit 205 are arranged in the wired device 201 of the local wired access network. The convergence unit 203 and the remote power supply unit 206 are arranged in the remote base station device 202.

The base station access processing unit 204 is remotely connected with the convergence unit 203 via wired cable. The base station outdoor processing units 208 are nearby connected with the convergence unit 203 via wired cable. The remote power supply unit 206 is remotely connected with the central power supply unit 205 and nearby connected with the base station outdoor processing units 208 via wired cable. The base station access processing unit 204 and the convergence unit 203 can be considered as an access processing device combination, and the base station outdoor processing units 208 can be considered as terminal communication devices.

The central power supply unit 205 supplies power for the base station access processing unit 204. The remote power supply unit 206 supplies power for the convergence unit 203, and supplies power nearby for the base station outdoor processing units 208 via wired cable.

In the third embodiment, the optimal site selection for both original devices in the wired device 201 and the base station access processing unit 204 is implemented in accordance with the wired network planning; while the optimal site selection for the base station outdoor processing units 208 is implemented in accordance with the wireless network planning. The optimal site selection for the remote base station device 202 is implemented in accordance with the wired network planning or the wireless network planning, which is determined by the actual situations and requirements.

The base station outdoor processing units 208 are converged via the convergence unit 203 in the remote base station device 202, and remotely connected with the base station access processing unit 204 in the wired device via wired cable. The central power supply unit 205 in the wired device supplies remote DC power (for example, 2~5 kilometers) for the remote power supply unit 206 in the remote base station device 202. The remote power supply unit 206 in the remote base station device 202 supplies DC power for the base station outdoor processing unit 208 (the distance can be remote to a certain degree, such as 100-200 meters).

The convergence unit 203 converges wireless access signals received by the multiple base station outdoor processing units 208 and transmits the signals to the base station access processing unit 204, and distributes signals generated by the base station access processing unit 204 to the multiple base station outdoor processing units 208, so as to transmit the signals to wireless access subscribers via the antenna.

Compared with the first embodiment, the third embodiment can save wired cable between the wired device 201 and the base station outdoor processing unit 208.

The function of the power backup unit 207 is identical to the related description in the first embodiment.

Figure 6:
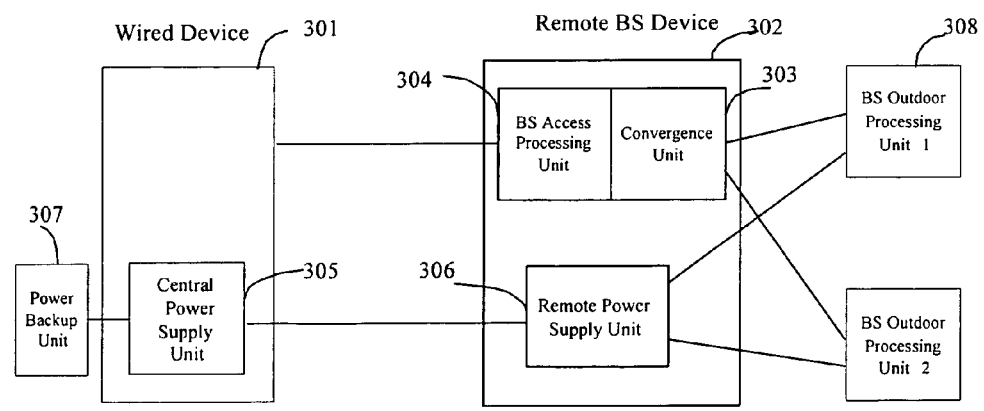
FIG. 6 is a schematic diagram illustrating the structure according to a fourth embodiment of the present invention.

In the first case, the fourth embodiment of the present invention is shown in FIG. 6, including a local wired device 301, a remote base station device 302, a convergence unit 303, a base station access processing unit 304, a central power supply unit 305, a remote power supply unit 306, a power backup unit 307, and base station outdoor processing units 308. The local communication device includes some devices of the original existing wired access network.

The base station access processing unit 304 and the convergence unit 303 are arranged in the remote base station device 302, which are connected with the wired device 301 of the local wired network and connected nearby with the base station outdoor processing units 308 via wired cable. The base station access processing unit 304 and the convergence unit 303 can be considered as an access processing device combination; and the base station outdoor processing units 308 can be considered as terminal communication devices.

The central power supply unit 305 is arranged in the wired device 301 of the local wired access network. The remote power supply unit 306 is arranged in the remote base station device 302 and remotely connected with the central power supply unit 305 via wired cable.

The remote power supply unit 306 supplies power for the base station access processing unit 304 and the convergence unit 303, and supplies power nearby for the base station outdoor processing unit 308 via wired cable.

In the fourth embodiment of the present invention, the optimal site selection for original devices in the wired device 301 is implemented in accordance with the wired network planning, while the optimal site selection for the base station outdoor processing units 308 is implemented in accordance with the wireless network planning.

The convergence unit 303 converges wireless access signals received by the multiple base station outdoor processing units 308 and transmits the signals to the base station access processing unit 304, and distributes signals generated by the base station access processing unit 304 to the multiple base station outdoor processing units 308, so as to transmit the signals to wireless access subscribers via the antenna.

The function of the power backup unit 307 is identical to the related description in the first embodiment.

Figure 7:
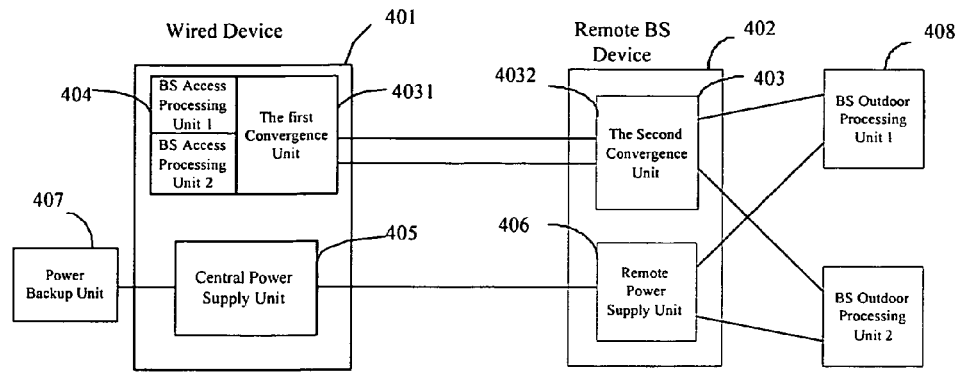
FIG. 7 is a schematic diagram illustrating the structure according to a fifth embodiment of the present invention.

In the first case, the fifth embodiment of the present invention is shown in FIG. 7, including a local wired device 401, a remote base station device 402, a first convergence unit 4031, a second convergence unit 4032, base station access processing units 404, a central power supply unit 405, a remote power supply unit 406, a power backup unit 407, and base station outdoor processing units 408. The local communication device includes some devices of the original existing wired access network.

The first convergence unit 4031 and the base station access processing units 404 are arranged in the wired device 401 of the local wired access network. The second convergence unit 4032 is arranged in the remote base station device 402, remotely connected with the first convergence unit 4031 and the base station access processing units 404 via wired cable, and nearby connected with the base station outdoor processing units 408 via wired cable. The base station access processing units 404, the first convergence unit 4031, and the second convergence unit 4032 can be considered as an access processing device combination; the base station outdoor processing units 408 can be considered as terminal communication devices.

The central power supply unit 405 supplies power for the first convergence unit 4031 and the base station access processing units 404. The remote power supply unit 406, remotely connected with the central power supply unit 405 via wired cable, supplies power for the second convergence unit 4032, and supplies power for the base station outdoor processing units 408 nearby via wired cable.

In the fifth embodiment of the present invention, the optimal site selection for original devices in the wired device 401 is implemented in accordance with the wired network planning, and the optimal site selection for the base station outdoor processing units 408 is implemented in accordance with the wireless network planning.

The first convergence unit 4031 and the second convergence unit 4032 converge wireless access signals received by the multiple base station outdoor processing units 408 and transmit the signals to the base station access processing units 404, and distribute signals generated by the base station access processing units 404 to the multiple base station outdoor processing units 408, so as to transmit the signals to wireless access subscribers via the antenna.

In the fifth embodiment of the present invention, through the first convergence unit 4031 and the second convergence unit 4032, the base station access processing units 404 in the wired device 401, the base station outdoor processing units 408, and the wired cables (signal cables or data cables) between the wired device 401 and the remote base station device 402 can be backup in "1+1" mode, "N+1" mode or resource pool redundancy mode.

The function of the power backup unit 407 is identical to the related description in the first embodiment.

Figure 8:
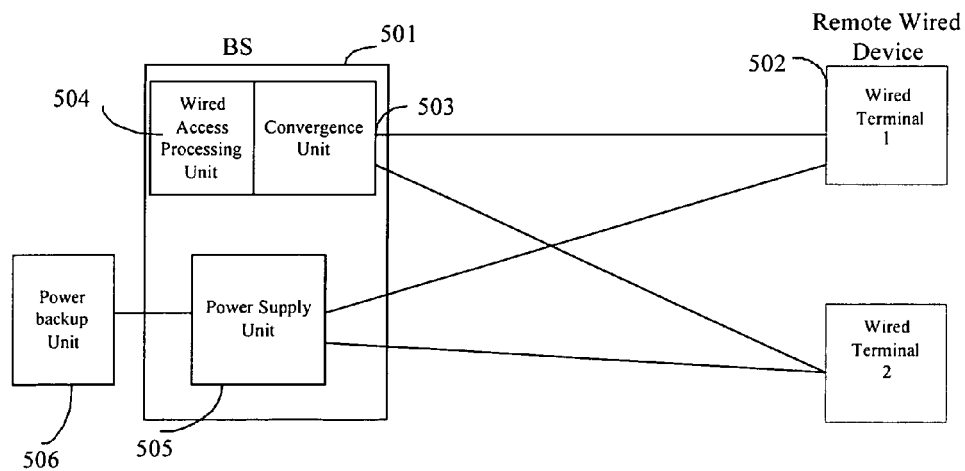
FIG. 8 is a schematic diagram illustrating the structure according to a sixth embodiment of the present invention.

In the second case, the sixth embodiment of the present invention is shown in FIG. 8, including a local base station device 501, remote wired devices (i.e., wired terminals) 502, a convergence unit 503, a wired access processing unit 504, a power supply unit 505, and a power backup unit 506. The local base station device 501 includes some devices of the original existing wireless access network.

In the sixth embodiment of the present invention, the wired access processing unit 504 and the convergence unit 503 are arranged in the base station device 501 of the local wireless access network. The optimal site selection for the base station device 501 of the local wireless access network is implemented in accordance with the wireless network planning. The wired terminal 502 is arranged remotely, and connected remotely with the base station device 501 of the local wireless access network via wired cable (such as optimal fiber or twisted-pair cable). The optimal site selection for the wired terminal 502 is implemented in accordance with the wired network planning.

The wired access processing unit 504 and the convergence unit 503 can be considered as an access processing device combination; and the wired terminals 502 can be considered as terminal communication devices.

The power supply unit 505, arranged in the base station device 501 of the local wireless access network, supplies power for the wired access processing unit 504 and the convergence unit 503, and supplies remote power for the wired terminals 502 via wired cable.

In the wired cable via which the local base station device 501 and the remote wired devices 502 are connected with each other, the signal cables and the power cables are separate logically, but can be separate or in co-line physically.

The wired terminals 502 and the wired access processing unit 504 perform wireless access processing interoperably. The convergence unit 503 converges wired access signals received by the multiple wired terminals 502 and transmits the signals to the wired access processing unit 504, and distributes signals generated by the wired access processing unit 504 to the multiple wired terminals 502, so as to transmit the signals to wired access subscribers. The power supply unit 505 transforms a cival power input (such as 110V/220V AC power) or a DC power input (such as −48V/−60V DC power) into a high-voltage DC power output (such as 270V DC power) and supplies power for the remote wired terminals 502 via wired cable (such as twisted-pair cable). The distance for remote power supply, which can be as much as 2~5 kilometers, is affected by factors such as the diameter of the wired cable, the number of the cable pairs, the power consumption of the wired terminals 502 and the output voltage of the power supply unit 505. The power supply unit 505 supports information interaction between the wired terminals 502 and the power supply unit 505, serving as an out-of-band management channel for the wired terminals 502. By this way, the monitoring and alarming function in normal case and in a failure can be realized so as to facilitate management, failure location, remote maintenance of devices, etc. The power backup unit 506 can be a battery pack, a UPS, a power generation set, or a second mains power.

The function of the power backup unit 507 is identical to the related description in the first embodiment.

In the second case, the seventh embodiment differs from the sixth embodiment of the present invention in that:

The power supply unit includes a central power supply unit and a remote power supply unit.

The central power supply unit is arranged in a wireless device of the local wireless access network, which supplies power for the wired access processing unit and the convergence unit. The remote power supply unit is arranged in the remote communication device and connected remotely with the central power supply unit, which supplies power for the wired terminal nearby.

The seventh embodiment is identical with the sixth embodiment except for the differences mentioned above, so the details will not be described.

Figure 9:
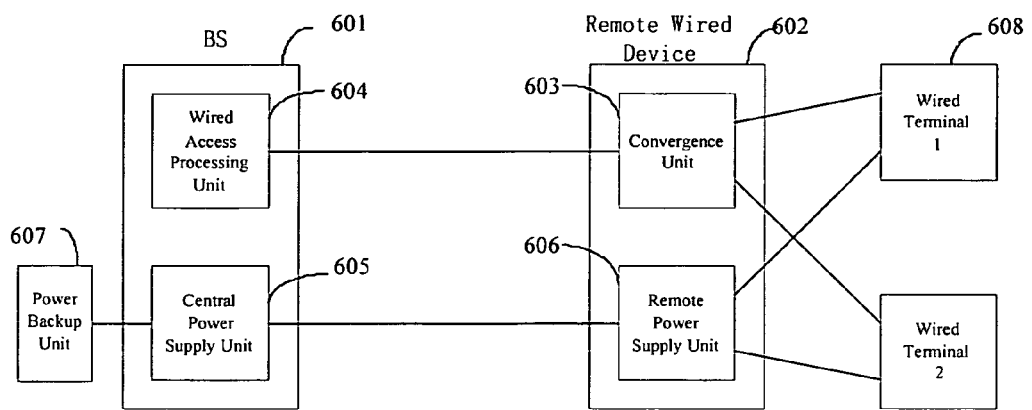
FIG. 9 is a schematic diagram illustrating the structure according to an eighth embodiment of the present invention.

In the second case, the eighth embodiment of the present invention is shown in FIG. 9, including a local wireless base station device 601, a remote wired device 602, a convergence unit 603, a wired access processing unit 604, a central power supply unit 605, a remote power supply unit 606, a power backup unit 607, and wired terminals 608. The local communication device includes some devices of the original existing wireless access network.

The wired access processing unit 604 and the central power supply unit 605 are arranged in the local wireless base station device 601. The convergence unit 603 and the remote power supply unit 606 are arranged in the remote wired device 602.

The wired access processing unit 604 is remotely connected with the convergence unit 603 via wired cable. The wired terminals 608 are connected nearby with the convergence unit 603 via wired cable. The remote power supply unit 606 is remotely connected with the central power supply unit 605 and connected nearby with the wired terminals 608 via wired cable. The wired access processing unit 604 and the convergence unit 603 can be considered as an access processing device combination; and the wired terminals 608 can be considered as terminal communication devices.

The central power supply unit 605 supplies power for the wired access processing unit 604. The remote power supply unit 606 supplies power for the convergence unit 603, and supplies power nearby for the wired terminals 608 via wired cable.

In the eighth embodiment of the present invention, the optimal site selection for both original devices of the local wireless base station device 601 and the wired access processing unit 604 is implemented in accordance with the wireless network planning; the optimal site selection for the wired terminals 608 is implemented in accordance with the wired network planning.

The wired terminals 608 are converged via the convergence unit 603 in the remote wired device 202, and remotely connected with the wired access processing unit 604 in the wired device via wired cable. The central power supply unit 605 in the wired device supplies remote DC power (for example, 2~5 kilometers) for the remote power supply unit 606 in the remote wired device 602. The remote power supply unit 606 in the remote wired device 602 supplies DC power for the wired terminals 608 (the distance can be remote to a certain degree, such as 100-200 meters).

The convergence unit 603 converges wired access signals received by the multiple wired terminals 608, transmits the signals to the wired access processing unit 604, and distributes signals generated by the wired access processing unit 604 to the multiple wired terminals 608, so as to transmit the signals to wired access subscribers.

The function of the power backup unit 607 is identical to the related description in the sixth embodiment.

Compared with the sixth embodiment, the eighth embodiment can save wired cable between the local wireless base station device 601 and the wired terminals 608.

Figure 10:
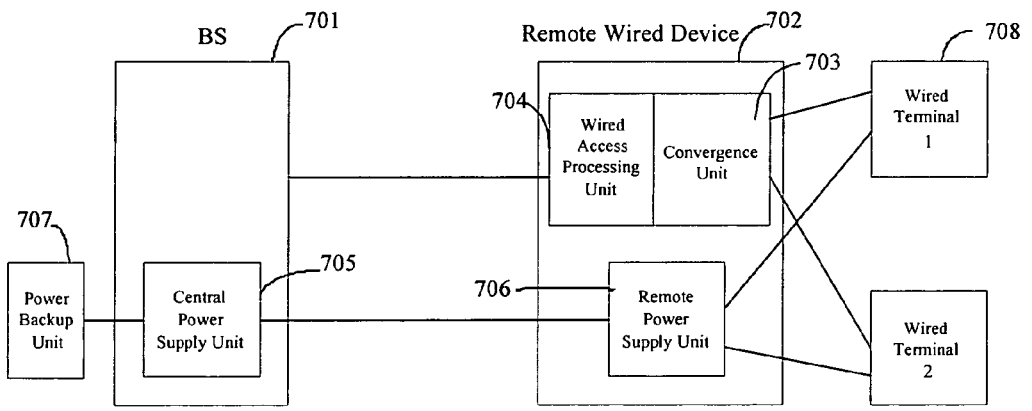
FIG. 10 is a schematic diagram illustrating the structure according to a ninth embodiment of the present invention.

In the second case, the ninth embodiment of the present invention is shown in FIG. 10, including a local wireless base station device 701, a remote wired device 702, a convergence unit 703, a wired access processing unit 704, a central power supply unit 705, a remote power supply unit 706, a power backup unit 707, and wired terminals 708. The local communication device includes some devices of the original existing wireless access network.

The wired access processing unit 704 and the convergence unit 703, arranged in the remote wired device 702, are connected with the local wireless base station device 701 and connected nearby with the wired terminals 708 via wired cable. The wired access processing unit 704 and the convergence unit 703 can be considered as an access processing device combination; and the wired terminals 708 can be considered as terminal communication devices.

The central power supply unit 705 is arranged in the local wireless base station device 701. The remote power supply unit 706 is arranged in the remote wired device 702 and remotely connected with the central power supply unit 705 via wired cable.

The remote power supply unit 706 supplies power for the wired access processing unit 704 and the convergence unit 703, and supplies power nearby for the wired terminals 708 via wired cable.

In the ninth embodiment of the present invention, the optimal site selection for original devices in the local wireless base station device 701 is implemented in accordance with the wired network planning, and the optimal site selection for the wired terminals 708 is implemented in accordance with the wireless network planning.

The convergence unit 703 converges wireless access signals received by the multiple wired terminals 708, transmits the signals to the wired access processing unit 704, and distributes signals generated by the wired access processing unit 704 to the multiple wired terminals 708, so as to transmit the signals to wired access subscribers.

The function of the power backup unit 707 is identical to the related description in the sixth embodiment.

Figure 11:
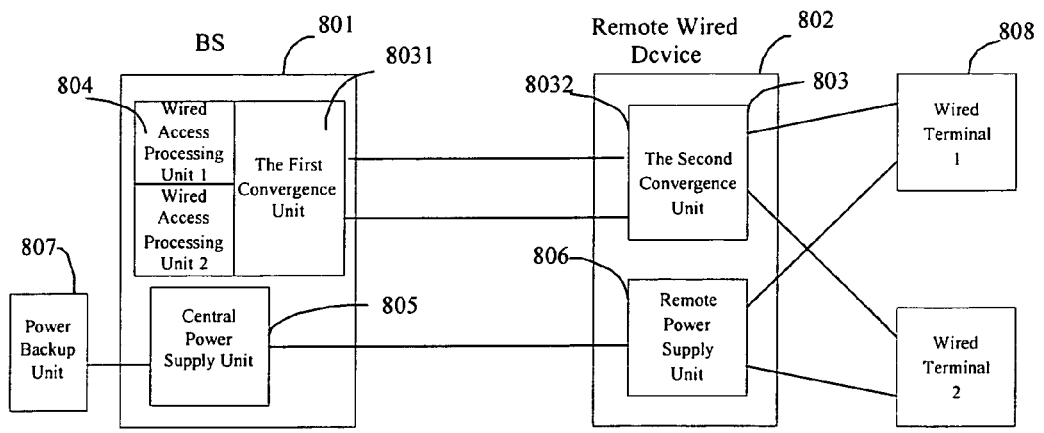
FIG. 11 is a schematic diagram illustrating the structure according to a tenth embodiment of the present invention.

In the second case, the tenth embodiment of the present invention is shown in FIG. 11, including a local wireless base station device 801, a remote wired device 802, a first convergence unit 8031, a second convergence unit 8032, wired access processing units 804, a central power supply unit 805, a remote power supply unit 806, a power backup unit 807, and wired terminals 808. The local communication device includes some devices of the original existing wireless access network.

The first convergence unit 8031 and the wired access processing units 804 are arranged in the local base station device 801. The second convergence unit 8032, arranged in the remote wired device 802, is remotely connected with the first convergence unit 8031 and the wired access processing units 804 via wired cable, and connected nearby with the wired terminals 808 via wired cable. The wired access processing units 804, the first convergence unit 8031, and the second convergence unit 8032 can be considered as an access device combination; and the wired terminals 808 can be considered as terminal communication devices.

The central power supply unit 805 supplies power for the first convergence unit 8031 and the wired access processing units 804. The remote power supply unit 806, remotely connected with the central power supply unit 805 via wired cable, supplies power for the second convergence unit 8032, and supplies power nearby for the wired terminals 808 via wired cable.

In the tenth embodiment of the present invention, the optimal site selection for original devices in the local wireless base station device 801 is implemented in accordance with the wireless network planning, and the optimal site selection for the wired terminals 808 is implemented in accordance with the wired network planning.

The first convergence unit 8031 and the second convergence unit 8032 converge wireless access signals received by the multiple wired terminals 808, transmit the signals to the wired access processing unit 804, and distributes signals generated by the wired access processing units 804 to the multiple wired terminals 808, so as to transmit the signals to wired access subscribers.

In the tenth embodiment of the present invention, the wired access processing units 804 in the local wireless base station device 801, the wired terminals 808, and the wired cable (signal cable or data cable) between the local wireless base station device 801 and the remote wired device 802 can be backup in "1+1" mode, "N+1" mode or a resource pool redundancy mode through the first convergence unit 8031 and the second convergence unit 8032.

The function of the power backup unit 807 is identical to the related description in the sixth embodiment.

The third case can be implemented by using the systems according to the above embodiments.

In the system according to an embodiment of the present invention, distributed device technique is used to arrange local communication devices of the newly-added network in a communication device of the original network, realizing the service functions of the newly-added network via information interaction between the local communication devices and the remote communication devices, so as to address the site selection conflict between the original wired device/wireless BS and the newly-added wireless BS/wired devices in the prior art, which is resulted from the differences between the wireless network planning and the wired network planning. Furthermore, the power supply unit can simultaneously supply power for the basic network and the newly-added network with the remote power supply technique, so as to address the ineffective utilization of resources and higher maintenance cost in the prior art.

The above-mentioned embodiments of the present invention are preferable. The protective scope of the present invention is not limited to these embodiments. Any variation or substitution within the technical scope of the present invention, which can be easily worked out by those skilled in the art, should be fallen in the protective scope of the present invention as defined in the attached claims.

What is claimed is:

1. An integrated access system of a wireless and wired network, comprising:
   a basic network; and
   a newly-added network comprising an access processing device combination and a terminal communication device, wherein the access processing device combination is combined with a communication device of the basic network to realize service functions of the newly-added network via information interaction with the terminal communication device,
   wherein the access processing device combination comprises a base station access processing unit arranged in the communication device of the basic network
   wherein the terminal communication device comprises a base station outdoor processing unit,
   wherein the access processing device combination further comprises a convergence unit remotely connected with the base station access processing unit and locally connected with the base station outdoor processing unit via wired cable, and
   wherein the convergence unit is configured to:
      converge wireless signals received by the base station outdoor processing unit;
      send the signals to the base station access processing unit; and
      send the signals generated by the base station access processing unit to the base station outdoor processing unit.

2. The system according to claim 1, further comprising:
   a power supply unit configured to:
      supply local power for the base station access processing unit and the convergence unit; and
      supply remote power for the base station outdoor processing unit.

3. The system according to claim 1, further comprising:
   a central power supply unit that is arranged in the communication device of the basic network and is configured to supply power for the base station access processing unit; and
   a remote power supply unit that is remotely connected with the central power supply unit via a wired cable, wherein the remote power supply unit is configured to:
      supply power for the convergence unit; and
      supply power for the base station outdoor processing unit via the wired cable.

4. The system according to claim 1, wherein the convergence unit is arranged in the communication device of the basic network.

5. The system according to claim 4, further comprising
   a power supply unit configured to:
      supply local power for the base station access processing unit and the convergence unit; and
      supply remote power for the base station outdoor processing unit.

6. The system according to claim 4, further comprising:
   a central power supply unit arranged in the communication device of the basic network and configured to supply power for the base station access processing unit and the convergence unit; and
   a remote power supply unit that is remotely connected with the central power supply unit via wired cable, wherein the remote power supply unit is configured to supply local power for the base station outdoor processing unit.

7. The system according to claim 1, further comprising:
   a central power supply unit arranged in the communication device of the basic network and configured to supply power for the base station access processing unit and the convergence unit; and
   a remote power supply unit that is remotely connected with the central power supply unit via wired cable and is configured to supply local power for the base station outdoor processing unit.

8. An integrated access system of a wireless and wired network, comprising:
   a basic network; and
   a newly-added network comprising an access processing device combination and a terminal communication device, wherein the access processing device combination is combined with a communication device of the basic network to realize service functions of the newly-added network via information interaction with the terminal communication device,
   wherein the access processing device combination comprises a base station access processing unit and a convergence unit which are remotely connected with the communication device of the basic network via wired cable,
   wherein the terminal communication device comprises a base station outdoor processing unit,
   wherein the base station access processing unit and the convergence unit are locally connected with the base station outdoor processing unit, and
   wherein the convergence unit is configured to:
      converge wireless signals received by the base station outdoor processing unit;
      send the signals to the base station access processing unit; and
      send the signals generated by the base station access processing unit to the base station outdoor processing unit.

9. The system according to claim 8, further comprising:
   a central power supply unit that is arranged in the communication device of the basic network; and
   a remote power supply unit that is remotely connected with the central power supply unit via a wired cable, wherein the remote supply unit is configured to:
      supply power for the base station access processing unit and the convergence unit; and
      supply local power for the base station outdoor processing unit via the wired cable.

10. An integrated access system of a wireless and wired network, comprising:
    a basic network; and
    a newly-added network comprising an access processing device combination and a terminal communication device, wherein the access processing device combination is combined with a communication device of the basic network to realize service functions of the newly-added network via information interaction with the terminal communication device, wherein the access processing device combination comprises a first convergence unit and a base station access processing unit which are arranged in the communication device of the basic network, wherein the terminal communication device comprises a base station outdoor processing unit, wherein the access processing device combination further comprises a second convergence unit remotely connected with the communication device of the basic network via wired cable and locally connected with the base station outdoor processing unit, wherein the second convergence unit is configured to:
converge wireless signals received by the base station outdoor processing unit; and
send the signals to the base station access processing unit through the first convergence unit, and wherein the first convergence unit is configured to send signals generated by the base station access processing unit to the base station outdoor processing unit through the second convergence unit.

11. The system according to claim 10, further comprising:
a central power supply unit that is arranged in the communication device of the basic network and is configured to supply power for the first convergence unit and the base station access processing unit; and
a remote power supply unit that is remotely connected with the central power supply unit via a wired cable, wherein the remote power supply unit is configured to:
supply power for the second convergence unit; and
supply local power for the base station outdoor processing unit via wired cable.

12. The system according to claim 11, wherein at least one of the base station access processing unit, the base station outdoor processing unit, the wired cable between the first convergence unit and the second convergence unit are backed up through the first convergence unit and the second convergence unit in "1+1" mode, "N+1" mode or resource pool redundancy mode.

13. The system according to claim 11, wherein each of the base station access processing unit, the base station outdoor processing unit, and the wired cable between the first convergence unit and the second convergence unit are backed up through the first convergence unit and the second convergence unit in "1+1" mode, "N+1" mode or resource pool redundancy mode.

14. An integrated access system of a wireless and wired network, comprising:
a basic network; and
a newly-added network comprising an access processing device combination and a terminal communication device, wherein the access processing device combination is combined with a communication device of the basic network to realize service functions of the newly-added network via information interaction with the terminal communication device,
wherein the access processing device combination comprises a wired access processing unit arranged in the communication device of the basic network,
wherein the terminal communication device comprises a wired terminal,
wherein the access processing device combination further comprises a convergence unit remotely connected with the communication device of the basic network via wired cable and locally connected with the wired terminal, and
wherein the convergence unit is configured to:
converge wired signals received by the wired terminal; send the signals to the wired access processing unit; and
send the signals generated by the wired access processing unit to the wired terminal.

15. The system according to the claim 14, further comprising:
a power supply unit arranged in the communication device of the basic network and configured to:
supply power for the communication device; and
supply remote power for the wired terminal via wired cable.

16. The system according to claim 14, further comprising:
a central power supply unit arranged in the communication device of the basic network and configured to supply power for the wired access processing unit; and
a remote power supply unit that is remotely connected with the central power supply unit via a wired cable, wherein the remote power supply unit is configured to:
supply power for the convergence unit; and
supply local power for the wired terminal via the wired cable.

17. The system according to claim 14, wherein the convergence unit is arranged in the communication device of the basic network.

18. The system according to claim 17, further comprising:
a power supply unit arranged in the communication device of the basic network and configured to:
supply power for the communication device; and
supply remote power for the wired terminal via the wired cable.

19. The system according to claim 17, further comprising:
a central power supply unit arranged in the communication device of the basic network and configured to supply power for the communication device; and
a remote power supply unit that is remotely connected with the central power supply unit via a wired cable, wherein the remote power supply unit is configured to supply local power for the wired terminal via the wired cable.

20. The system according to claim 14, further comprising:
a central power supply unit that is arranged in the communication device of the basic network and configured to supply power for the communication device; and
a remote power supply unit that is remotely connected with the central power supply unit via a wired cable and is configured to supply local power for the wired terminal via the wired cable.

21. An integrated access system of a wireless and wired network, comprising:
a basic network; and
a newly-added network comprising an access processing device combination and a terminal communication device, wherein the access processing device combination is combined with a communication device of the basic network to realize service functions of the newly-added network via information interaction with the terminal communication device,
wherein the access processing device combination comprises a wired access processing unit and a convergence unit that are remotely connected with the communication device of the basic network,
wherein the wired access processing unit and a convergence unit are locally connected with a wired terminal via a wired cable, wherein the wired cable is included in the terminal communication device, and wherein the convergence unit is configured to:
 converge wired signals received by the wired terminal;
 send the signals to the wired access processing unit; and
 send the signals generated by the wired access processing unit to the wired terminal.

22. The system according to claim 21, further comprising:
a central power supply unit configured to supply power for the communication device of the basic network; and
a remote power supply unit that is remotely connected with the central power supply unit via a wired cable, wherein the remote power supply unit is configured to:
 supply power for the wired access processing unit and the convergence unit; and
 supply power for the wired terminal via the wired cable.

23. An integrated access system of a wireless and wired network, comprising:
a basic network; and
a newly-added network comprising an access processing device combination and a terminal communication device, wherein the access processing device combination is combined with a communication device of the basic network to realize service functions of the newly-added network via information interaction with the terminal communication device,
wherein the access processing device combination comprises a first convergence unit and a wired access processing unit which are arranged in the communication device of the basic network,
wherein the terminal communication device comprises a wired terminal,
wherein the access processing device combination further comprises a second convergence unit that is remotely connected with the communication device of the basic network and locally connected with the wired terminal via the wired cable, and
wherein the second convergence unit is configured to:
 converge wired signals received by the wired terminal;
 send the signals to the wired access processing unit through the first convergence unit; and
 send the signals generated by the wired access processing unit to the wired terminal through the first convergence unit.

24. The system according to claim 23, further comprising:
a central power supply unit that is arranged in the communication device of the basic network and configured to supply power for the first convergence unit and wired access processing unit; and
a remote power supply unit that is remotely connected with the central power supply unit via a wired cable, wherein the remote power supply unit is configured to:
 supply power for the second convergence unit; and
 supply local power for the wired terminal via the wired cable.

25. The system according to claim 24, wherein at least one of the wired access processing unit, the wired terminal, and the wired cable between the first convergence unit and the second convergence unit are backed up through the first convergence unit and the second convergence unit in "1+1" mode, "N+1" mode or resource pool redundancy mode.

26. The system according to claim 24, wherein each of the wired access processing unit, the wired terminal, and the wired cable between the first convergence unit and the second convergence unit are backed up through the first convergence unit and the second convergence unit in "1+1" mode, "N+1" mode or resource pool redundancy mode.

* * * * *